(12) United States Patent
Rittiger

(10) Patent No.: US 8,897,045 B2
(45) Date of Patent: Nov. 25, 2014

(54) PILOT CONTROL OF A VOLTAGE SOURCE CONVERTER

(75) Inventor: Jürgen Rittiger, Herzogenaurach (DE)

(73) Assignee: Siemens Aktiengesellsschaft, Munich (DE)

(*) Notice: Subject to any disclaimer, the term of this patent is extended or adjusted under 35 U.S.C. 154(b) by 1429 days.

(21) Appl. No.: 12/329,260

(22) Filed: Dec. 5, 2008

(65) Prior Publication Data

US 2009/0147551 A1 Jun. 11, 2009

(30) Foreign Application Priority Data

Dec. 5, 2007 (DE) .................. 10 2007 058 749

(51) Int. Cl.
| | |
|---|---|
| *H02M 7/521* | (2006.01) |
| *H02M 7/797* | (2006.01) |
| *H02J 3/36* | (2006.01) |
| *H02M 7/00* | (2006.01) |
| *H02M 1/06* | (2006.01) |

(52) U.S. Cl.
CPC .. *H02J 3/36* (2013.01); *Y02E 60/60* (2013.01); *H02M 7/797* (2013.01)
USPC .............. 363/137; 363/95; 363/131; 363/138

(58) Field of Classification Search
USPC .............. 363/95, 96, 99, 131, 132, 135, 136, 363/137, 138
See application file for complete search history.

(56) References Cited

U.S. PATENT DOCUMENTS

| 4,984,147 A | 1/1991 | Araki | |
|---|---|---|---|
| 5,091,839 A | * 2/1992 | Gaul et al. | ...................... 363/41 |

(Continued)

FOREIGN PATENT DOCUMENTS

| DE | 195 23 565 C1 | 11/1996 |
|---|---|---|
| DE | 10206191 A1 | 6/2003 |

(Continued)

OTHER PUBLICATIONS

Dannehl et al: "PWM Rectifier with LCL-Filter using different Current Control Structures", University of Kiel / Danfoss Drives; EPE 2007, Aalborg; Sep. 2-5, 2007; DE; Sep. 2, 2007.
EPE 2007 AALBORG, "12th European Conference on Power Electronics and Applications" Sep. 2-5, 2007, Allborg, Denmark, http://www.epe.2007.com.
Blasko et al.: "A Novel Control to Actively Damp Resonance in Input LC Filter of a Three-Phase Voltage Source Converter"; IEEE Transactions on Industry Applications, vol. 33, No. 2, Mar./Apr. 1997;.

(Continued)

*Primary Examiner* — Adolf Berhane
*Assistant Examiner* — Henry Lee, III
(74) *Attorney, Agent, or Firm* — Laurence A. Greenberg; Werner H. Stemer; Ralph E. Locher

(57) ABSTRACT

An apparatus for controlling a converter has an ignition unit connected to power semiconductors in the converter and provides control signals for actuating the semiconductors. The apparatus has a control unit whose input is connected to measuring sensors providing actual values and whose output side is connected to the ignition unit. The control unit provides a reference variable for the ignition unit based on setpoint values and the actual values and the ignition unit actuates the power semiconductors such that the actual value corresponds to at least one of the setpoint values. A pilot unit has an output connected to the ignition unit and measures for calculating a step change reference variable for the ignition unit on the basis of at least one of the setpoint values. The ignition unit actuates the power semiconductors based on the step change reference variable.

6 Claims, 2 Drawing Sheets

(56) References Cited

U.S. PATENT DOCUMENTS

| | | | | |
|---|---|---|---|---|
| 5,097,193 | A | * | 3/1992 | Neis et al. ............... 318/800 |
| 5,621,627 | A | * | 4/1997 | Krawchuk et al. ............... 363/37 |
| 5,673,196 | A | * | 9/1997 | Hoffman et al. ............... 702/65 |
| 6,141,196 | A | * | 10/2000 | Premerlani et al. ............... 361/78 |
| 6,806,676 | B2 | | 10/2004 | Papiernik et al. |
| 7,746,039 | B2 | | 6/2010 | Hoffmann et al. |

FOREIGN PATENT DOCUMENTS

| | | |
|---|---|---|
| DE | 10336068 A1 | 3/2005 |
| DE | 195 39 557 B4 | 11/2006 |
| EP | 0884834 A1 | 12/1998 |

OTHER PUBLICATIONS

Janning et al.: "Highly dynamic vector control with adaptive line harmonic adjustment for high power voltage source converters"; Electrical Engineering 81; 1998.

Janning: "Regelung eines statischen Netzkupplungs-Umrichters zur Speisung des 16 2/3-Hz-Bahnstromnetzes aus dem 50-Hz-Landesnetz"; Dissertation, TU Clausthal; VDI Fortschritt-Berichte, Reihe 21, Elektrotechnik, Nr. 235, 1997; DE—Statement of Relevance.

Dörrscheidt et al.: "Regelungstechnik Einführung in Die Methoden Und Ihre Anwendung"; Hüthing Buch Verlag Heidelberg, ISBN 3-7785-2336-8; 1994; DE—Statement of Relevance.

Vorsteuerung [Feedforward]; pp. 2; Wikipedia; 2012.

* cited by examiner

PILOT CONTROL OF A VOLTAGE SOURCE CONVERTER

CROSS-REFERENCE TO RELATED APPLICATION

This application claims the priority, under 35 U.S.C. §119, of German application DE 10 2007 058 749.1, filed Dec. 5, 2007; the prior application is herewith incorporated by reference in its entirety.

BACKGROUND OF THE INVENTION

Field of the Invention

The invention relates to an apparatus for controlling a converter, connected to a DC voltage circuit and to an AC voltage network having a plurality of phases. The apparatus has an ignition unit which can be connected to controllable power semiconductors in the converter and provides control signals for actuating the power semiconductors, and a control unit whose input side is connected to measuring sensors providing actual values and whose output side is connected to the ignition unit. The control unit provides a reference variable for the ignition unit on the basis of at least one prescribed setpoint value and the actual values and the ignition unit actuates the power semiconductors such that the actual values or a variable derived from the actual values correspond or corresponds to at least one of the setpoint values.

The invention also relates to a method for controlling a converter, connected to a DC voltage circuit and to phases of an AC voltage network, with controllable power semiconductors, in which setpoint values are prescribed for a control unit, actual values are sensed on the AC voltage side of the converter using phase measuring sensors and are supplied to the control unit. The control unit compares the actual values or a variable derived from the actual values with at least one of the setpoint values. A controller takes the comparison as a basis for producing a reference variable and transmits it to an ignition unit, and the ignition unit actuates the power semiconductors such that the actual values or a variable derived from the actual values correspond or corresponds to at least one of the setpoint values.

An apparatus of this kind and a method of this kind are already known from the prior art. Thus, converters used in the field of high-voltage DC transmission, for example, have a control unit which takes prescribed setpoint values as a basis for producing a reference variable, such as a voltage to be set on the AC voltage connections of the respective converter. Finally, the reference variable provided on the output side of the control unit is supplied to an ignition unit which actuates the power semiconductors such that the desired AC voltage is produced on the AC voltage connections of the converter, for example. Normally, the control unit compares at least one measured value, or in other words actual value, with a prescribed setpoint variable, such as a prescribed setpoint reactive power and/or setpoint active power. The prescribed setpoint reactive power and setpoint active power are compared with an actual reactive power and actual active power which are actually transmitted by the converter, for example. A controller in the control unit takes this comparison as a basis for producing a reference variable, that is to say in this case an AC voltage to be set on the AC side of the converter, so that setpoint and actual values match one another as accurately as possible. A suitable controller is a commercially available proportional/integral controller, for example.

The apparatus based on the prior art has the attendant drawback that undesirable control delays may arise upon a transition from an old to a new steady-state operating point, for example as a result of a setpoint value step change. The control delays are dependent on the time constants of the controller used and on the time constant of the control path.

SUMMARY OF THE INVENTION

It is accordingly an object of the invention to provide a pilot control of a voltage source converter which overcomes the above-mentioned disadvantages of the prior art methods and devices of this general type, which can be quickly and reliably transferred to a new steady-state operating point.

With the foregoing and other objects in view there is provided, in accordance with the invention, an apparatus for controlling a converter, connected to a DC voltage circuit and to an AC voltage network having a plurality of phases. The apparatus includes an ignition unit to be connected to controllable power semiconductors in the converter and providing control signals for actuating the controllable power semiconductors, measuring sensors, and a control unit having an input side connected to the measuring sensors providing actual values and an output side connected to the ignition unit. The control unit provides a reference variable for the ignition unit on a basis of at least one prescribed setpoint value and the actual values. The ignition unit actuates the controllable power semiconductors such that at least one of the actual values or a variable derived from the actual values corresponds to the at least one of the prescribed setpoint value. A pilot unit is provided and has an output coupled to the ignition unit. The pilot unit calculates a step change reference variable for the ignition unit on a basis of at least the prescribed setpoint value. The ignition unit actuates the controllable power semiconductors on a basis of the step change reference variable.

Against the background of the apparatus cited at the outset, the invention achieves the object by a pilot unit whose output is connected or can be connected to the ignition unit and which has measures for calculating a step change reference variable for the ignition unit on the basis of at least one of the setpoint values, wherein the ignition unit actuates the power semiconductors on the basis of the step change reference variable.

Against the background of the method cited at the outset, the invention achieves the object by virtue of a pilot unit calculating at least one step change reference variable and each step change reference variable being transmitted to the ignition unit, wherein the power semiconductors are actuated if necessary on the basis of at least one of the step change reference variables.

The invention provides a pilot unit which calculates an input variable for the ignition unit on the basis of at least one of the setpoint values for the control unit when necessary. Upon the necessity, the output of the control unit is at least no longer solely critical for the actuation of the power semiconductors in the converter. This is advantageous particularly when necessary, the necessity arising in the event of an abrupt change in the prescribed setpoint values, for example. On the basis of the prior art, in such a case the control unit will find a large discrepancy between the actual values and the abruptly changed setpoint values. On account of the time constants of the control unit, on the one hand, and of the control path, on the other, the new steady-state operating point is reached only arduously in the case of customary control. In line with the invention, the input signal for the ignition unit is therefore calculated using one of the prescribed setpoint values or a plurality of prescribed setpoint values to obtain a step change reference variable at least up to a predetermined proportion. The calculated step change reference variable as an output signal from the pilot unit is put onto the output signal from the control unit, for example, or else is applied to the input of the ignition unit instead of the output signal from the control unit, so that the ignition unit actuates the power semiconductors in the converter at least also on the basis of the step change reference variable. The pilot unit speeds up the transition from one steady-state operating point to another steady-state operating point and in this way improves the control dynamics.

Expediently, the control unit is connected to current measuring sensors which sense phase currents flowing on the AC side of the converter to obtain phase current measured values and which provide the phase current measured values as actual values for the control unit. In line with this advantageous further development of the invention, the control unit takes current control into account, with the phase current measured values on the AC side of the converter being sensed as actual values.

Advantageously, the control unit has transformation units for converting phase measurement values into phasor measured values and has back-transformation units for converting phasor measured values into phase measured values. Such conversion units for converting, by way of example, three-phase AC or AC-voltage values into two-dimensional phasor variables are known to a person skilled in the art, which means that there is no need to discuss them in more detail at this juncture. A more detailed exemplary embodiment is specified in the description of the figures.

Advantageously, the control unit has a conversion unit for converting prescribed setpoint values into a setpoint active current $I_{dsetpoint}$ and a setpoint reactive current $I_{qsetpoint}$. Examples of prescribed setpoint values are a setpoint active power $P_{setpoint}$ a setpoint reactive power $Q_{setpoint}$. In this connection, it should be noted that only converters with disconnectable power semiconductors which are connected to a DC voltage intermediate circuit, that is to say what are known as "voltage source converters", allow active power and reactive power to be set independently. In the case of nondisconnectable power semiconductors, such as thyristors, for example, on the other hand, there is no independent setting of these variables. The converter according to the invention is therefore advantageously what is known as a voltage source converter, that is to say a converter with disconnectable power semiconductors which are connected to a DC voltage intermediate circuit. In this case, each disconnectable power semiconductor has a freewheeling diode connected in parallel with it, for example. The topology of the converter is basically arbitrary in the context of the invention. Thus, the invention covers two-point or multipoint converters, for example, and particularly what are known as multilevel converters.

Expediently, the pilot unit has its output side connected to the control unit. In this way, the pilot unit can influence, block, or the like, the output of the control unit.

In line with one further development in this regard, the pilot unit is notified of a necessity, for example an abrupt alteration to at least one of the setpoint values, on the input side via a communication signal. As a departure from this, the pilot unit ascertains the necessity independently. The pilot unit, which is connected to the control unit, instructs the control unit to interrupt the transmission of reference variables to the pilot unit, for example. Instead, the pilot unit transmits its step change reference variables to the ignition unit, so that the power semiconductors in the converter are controlled solely on the basis of the pilot unit. As a departure from this, however, the invention also allows a signal from the pilot unit to the control unit to be taken as a basis for reducing the output values from the control unit or limiting them to a particular value, with the pilot unit calculating appropriate step change reference variables which are put onto the output signals from the control unit, that is to say are added to them.

In this connection, it is self-evidently also possible for a selection unit to be provided whose input side is connected both to the pilot unit and to the control unit, the output or outputs of the selection unit being connected to the ignition unit. The selection unit is set up such that it either ascertains a necessity independently or is notified of the necessity by an external point. In the latter case, the selection unit's input side can be actuated externally. When the necessity is ascertained or accordingly communicated, the selection unit no longer forwards the output signals from the control unit to the ignition unit, for example, as in normal operation, but rather forwards the output signals from the pilot unit instead. Self-evidently, it is also possible in this connection for appropriately calculated or reduced output variables to be combined with one another, for example put onto one another, and for the sum or other combination to be transmitted from the selection unit to the ignition unit. In this case, the selection unit contains an adder, a quotient formation unit or the like.

In one advantageous further development of the method according to the invention, the setpoint values are calculated by a conversion unit on the basis of original setpoint values. This has already been discussed in connection with the refinements of the apparatus according to the invention. At this juncture, the intention is therefore merely to mention once more the conversion of a setpoint active power and a setpoint reactive power into a setpoint active current and into a setpoint reactive current, for example.

Expediently, the pilot unit determines the necessity on the basis of the change in the prescribed setpoint values. In line with this expedient refinement of the invention, the setpoint values are supplied both to the control unit and to the pilot unit. To this end, the control unit and the pilot unit are connected to a superordinate control center, for example, which is occupied by a control engineer or the like, for example. As has already been explained, the pilot unit interrupts the transmission of the reference variable from the control unit to the ignition unit when necessary, for example, and instead sends step change reference variables to the ignition unit.

Expediently, the pilot unit uses the impedance of a transformer as a parameter for calculating the step change reference variable, the transformer being connected between the converter and the AC voltage network. The impedance of the transformer is usually a complex variable, which means that two parameters are required for calculating the step change reference variables.

In line with one preferred refinement of the method, the pilot unit calculates a polyphase AC voltage which is desired on the AC voltage connections of the converter as a step change reference variable. In this connection, it should be pointed out that in one preferred refinement, the output variables from the control unit also correspond to a polyphase AC voltage which is to be produced by the converter. The ignition unit converts the desired AC voltages into appropriate control signals—for example in the form of pulse width modulation—so that the desired AC voltage is produced on the AC voltage side of the converter, whose power semiconductors are connected to the ignition unit.

In line with another advantageous refinement of the invention, the pilot unit calculates the AC voltage first of all as two-dimensional phasor variables $U_{VSCd}$ and $U_{VSCq}$ on the basis of $U_{VSCd}=U_{Nd}+R*I_{dsetpoint}-X*I_{qsetpoint}$ and $U_{VSCq}=X*I_{dsetpoint}+R*I_{qsetpoint}$, where $U_{VSCd}$ is the voltage component drop on the AC voltage side of the converter in phase with the AC voltage of the AC voltage network $U_{NS}$, and $U_{VSCq}$ is the voltage component drop on the AC side of the converter with a 90° phase shift relative to the AC voltage of the AC voltage network $U_{NS}$, where R is the real part of the impedance of a transformer arranged between converter and AC voltage network, X is the imaginary part of the impedance of the transformer, $I_{dsetpoint}$ is the setpoint current in phase with $U_{VSCd}$ and $I_{qsetpoint}$ is the current in phase with $U_{VSCq}$.

Other features which are considered as characteristic for the invention are set forth in the appended claims.

Although the invention is illustrated and described herein as embodied in a pilot control of a voltage source converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
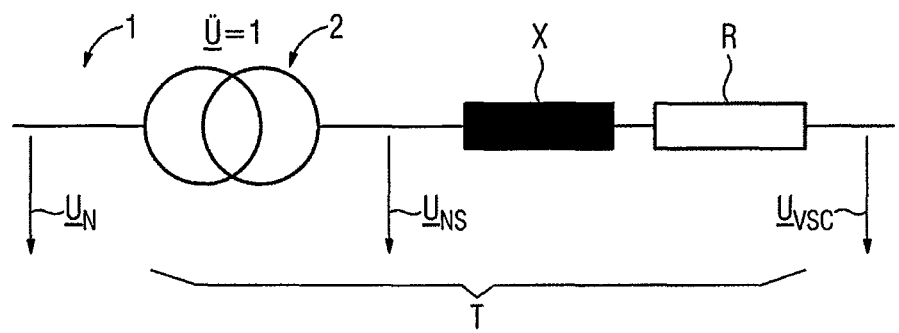
FIG. 1 is a schematic illustration of an exemplary embodiment of a connection of an AC side of a converter to an AC voltage network according to the invention.

Referring now to the figures of the drawing in detail and first, particularly, to FIG. 1 thereof, there is shown a connection of the AC side of a converter, which is not shown graphically, to an AC voltage network 1 which is intended to be supplied with a voltage by the converter. For reasons of clarity, only one phase has been illustrated in FIG. 1, but it is hereby pointed out that the exemplary embodiment shown is a three-phase AC voltage network 1 with three-phase connecting lines to the three-terminal AC voltage connection of the converter. The AC voltage network 1 with the AC voltage $\underline{U}_N$ is connected to the converter via a transformer 2 which has an idealized transformation ratio of 1. If only the transformation ratio is taken into account, the voltage $\underline{U}_{NS}$ drops across the secondary winding of the transformer 2. The transformer 2 has the transformer parameters X and R, where X corresponds to the complex component of the transformer impedance and R corresponds to the real component of the transformer impedance. Taking account of the transformer parameters X and R, the AC-voltage-side converter voltage $\underline{U}_{VSC}$.

Figure 2:
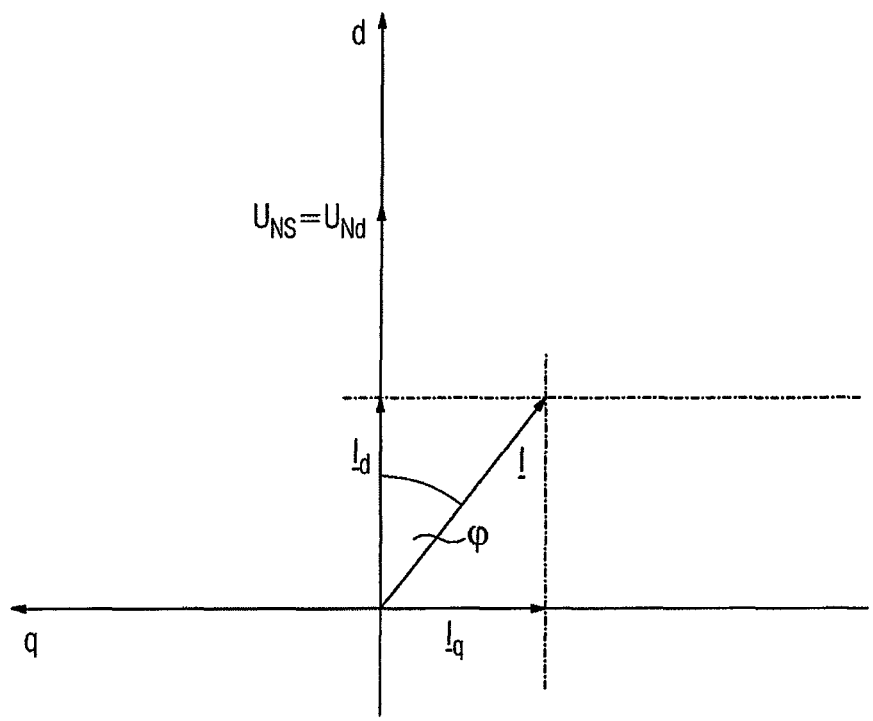
FIG. 2 is a schematic phasor diagram.

FIG. 2 shows the circumstances appearing between current and voltage in a phasor model, which is known as such. In this case, only the amplitudes arising and the phase differences appearing between current and voltage are taken into account. The phasor for the voltage in the AC network $\underline{U}_N$ or $\underline{U}_{NS}$ has a colinear orientation with respect to the D-axis in this case. The phasor appearing for the current I has a component $I_d$ in the direction of the network voltage $\underline{U}_{NS}$, which is not phase shifted in comparison with the network voltage. The phase shift is illustrated in the phasor model as an angle which is enclosed by the d-axis and the respective phasor variable in respect of the coordinate origin. A current component $I_q$ with a 90-degree phase shift in comparison with $\underline{U}_{NS}$ is in colinear orientation with respect to the q-axis. $I_d$ is subsequently referred to as active current and $I_q$ as reactive current.

Figure 3:
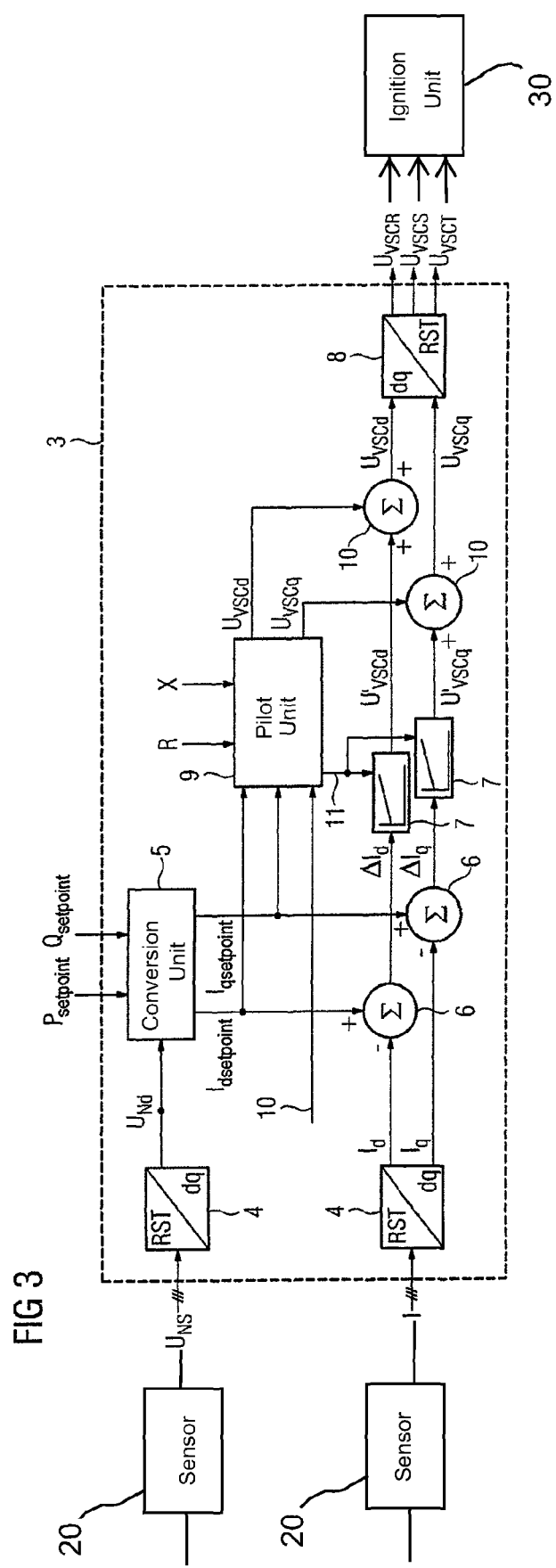
FIG. 3 is a block circuit diagram of an exemplary embodiment of an apparatus according to the invention and of the method according to the invention.

FIG. 3 shows an exemplary embodiment of the apparatus according to the invention and of the method according to the invention. Thus, FIG. 3 shows a control unit 3 whose output side provides converter voltages $U_{VSCR}$, $U_{VSCS}$ and $U_{VSCT}$ for each of the three phases of the AC voltage connection of the converter. The converter voltages are used as a reference variable for an ignition unit 30, and which in turn is connected in a known manner to power semiconductors, in this case IGBTs, in the converter. In this case, the topology of the converter can be selected as desired. However, a fundamental aspect is that the ignition unit takes the converter voltages as a basis for producing such control signals for the power semiconductors connected to it that the converter voltages $U_{VSCR}$, $U_{VSCS}$ and $U_{VSCT}$ prescribed by the reference variable drop with sufficient accuracy on the AC voltage side of the converter. The input side of the control unit 3 is connected to measuring sensors 20, which provide the actual voltage $U_{NS}$ for each phase of the AC voltage network. Furthermore, the control unit 3 is connected to current measuring sensors which respectively sense a phase current in the phases of the AC voltage network 1 and transmit an actual current I for each phase to the control unit 3. Both the actual voltage $U_{NS}$ and the actual current I are transformed by a respective transformation unit 4 into phasor measured values, with a phasor variable $U_{Nd}$ being produced from the actual voltages $U_{NS}$ and an actual active current $I_d$ and an actual reactive current $I_q$ being produced from the actual current values.

In addition, a conversion unit 5 is provided which calculates a setpoint active current $I_{dsetpoint}$ and a setpoint reactive current $I_{qsetpoint}$ from a prescribed setpoint value for an active power $P_{setpoint}$ and from a setpoint value for the reactive power $Q_{setpoint}$ in a manner which is known per se. The setpoint active current and the setpoint reactive current are respectively transmitted to a difference formation unit 6 which forms the difference between setpoint active current and actual active current $\Delta I_d$ and the difference between setpoint reactive current and actual reactive current $\Delta I_q$, with the differences $\Delta I_d$, $\Delta I_q$ respectively being supplied to a controller 7, in this case a Pi controller, whose output side provides a reference variable in the phasor model $U'_{VSCd}$ and $U'_{VSCq}$. The reference variables $U'_{VSCd}$ and $U'_{VSCq}$ are transformed by a back-transformation unit 8 into the converter voltages $U_{VSCR}$, $U_{VSCS}$ and $U_{VSCT}$ as a reference variable for the ignition unit.

FIG. 3 also reveals a pilot unit 9 whose input side is supplied with the setpoint active current $I_{dsetpoint}$ and the setpoint reactive current $I_{qsetpoint}$ and also with the transformer parameters X, R. On the basis of the input variables, the pilot unit 9 calculates step change reference variables $U_{VSCd}$ and $U_{VSCq}$. However, this is done only if necessary, which, in the exemplary embodiment, is the case when the setpoint values $P_{setpoint}$ and $Q_{setpoint}$ are altered to such an extent that the difference between the old setpoint values and the new setpoint values exceeds a particular threshold value. This is communicated to the pilot unit 9 by a trigger signal 10, for example, from a control center, which is not shown graphically, for example. Next, the pilot unit 9 calculates the step change reference variables $U_{VSCd}$ and $U_{VSCq}$ in a manner which is described further below, the controller 7 simultaneously being addressed by a signal message 11 to set the reference variable $U'_{VSCd}$ or $U'_{VSCq}$ to zero. The summators 10 then form the sum of the step change reference variables and the reference variables, so that the step change reference variables $U_{VSCd}$ and $U_{VSCq}$ are obtained at the output of the summators 10 upon the necessity. These are then used to calculate the three-phase convertor voltages $U_{VSCR}$, $U_{VSCS}$ and $U_{VSCT}$. The converter voltages calculated in this manner improve the dynamics of the convertor's control for a transition of the steady-state operating point.

The calculation of the step change reference variables is described below. In the phasor domain, the convertor voltage $U_{VSCd}$ and $U_{VSCq}$ dropping on the AC side of the converter is obtained on the basis of $U_{VSCd} = U_{Nd} + R*I_{dsetpoint} - X*I_{qsetpoint}$ and $U_{VSCq} = X*I_{dsetpoint} + R*I_{qsetpoint}$, where $U_{VSCd}$ corresponds to the convertor voltage which is in phase with the network voltage $U_{NS}$ and where $U_{VSCq}$ corresponds to the converter voltage which has a 90-degree phase shift relative to the network voltage $U_{NS}$. $I_{dsetpoint}$ is the setpoint active current, with $I_{qsetpoint}$ being the setpoint reactive current. X is the complex component of the impedance of the transformer. R corresponds to the real part of the impedance of the transformer 2, as illustrated in FIG. 1.

The invention claimed is:

1. A method for controlling a converter, connected to a DC voltage circuit and to phases of an AC voltage network, the converter having controllable power semiconductors, which comprises the steps of:
   prescribing setpoint values for a control unit;
   sensing actual values on an AC voltage side of the converter using phase measuring sensors and supplying the actual values to the control unit;
   comparing in the control unit one of the actual values or a variable derived from the actual values with at least one of the setpoint values resulting in comparison results;
   providing the comparison results to a controller, the controller using the comparison results as a basis for producing a reference variable;
   transmitting the reference variable to an ignition unit, and the ignition unit actuating the controllable power semiconductors such that the actual values or a variable derived from the actual values corresponds to at least one of the setpoint values; and
   providing a pilot unit which takes parameters as a basis for calculating at least one step change reference variable and the step change reference variable is transmitted to the ignition unit, and the controllable power semiconductors are actuated on a basis of the step change reference variable;
   wherein the pilot unit interrupts a transmission of the reference variable from the control unit to the ignition unit and instead transmits the step change reference variable to the ignition unit.

2. The method according to claim 1, which further comprises calculating the setpoint values with a conversion unit on a basis of original setpoint values.

3. The method according to claim 1, wherein the pilot unit determines the necessity on the basis of a change in the setpoint values.

4. The method according to claim 1, which further comprises using, in the pilot unit, an impedance of a transformer as a parameter for calculating the step change reference variable, the transformer being connected between the converter and the AC voltage network.

5. The method according to claim 1, which further comprises calculating, in the pilot unit, a polyphase AC voltage which is desired on an AC side of the converter as the step change reference variable.

6. The method according to claim 5, which further comprises calculating, in the pilot unit, the polyphase AC voltage first of all as two-dimensional phasor variables on a basis of $U_{VSCd} = U_{Nd} + R*I_{dsetpoint} - X*I_{qsetpoint}$ and $U_{VSCq} = X*I_{dsetpoint} R*I_{qsetpoint}$, where $U_{VSCd}$ is a voltage component drop on an AC voltage side of the converter in phase with the polyphase AC voltage of the AC voltage network, and $U_{VSCq}$ is a voltage component drop on the AC side of the converter with a 90° phase shift relative to the polyphase AC voltage of the AC voltage network, R is a real part of the impedance of a transformer arranged between converter and AC voltage network, X is an imaginary part of the impedance of the transformer, $I_{dsetpoint}$ is a setpoint current in phase with $U_{VSCd}$ and $I_{dsetpoint}$ is a setpoint current in phase with $U_{VSCq}$.

* * * * *